United States Patent
Ratner (12) United States Patent (10) Patent No.: US 9,090,323 B1
(45) Date of Patent: Jul. 28, 2015

(54) CONTROLLING DESCENT OF A ZERO PRESSURE BALLOON

(71) Applicant: Google Inc., Mountain View, CA (US)

(72) Inventor: Daniel Ratner, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/179,064

(22) Filed: Feb. 12, 2014

(51) Int. Cl.
- B64B 1/40 (2006.01)
- B64B 1/62 (2006.01)
- B64B 1/64 (2006.01)

(52) U.S. Cl.
CPC .... B64B 1/62 (2013.01); B64B 1/64 (2013.01)

(58) Field of Classification Search
USPC .................... 244/31, 98, 33, 99, 96
See application file for complete search history.

(56) References Cited

U.S. PATENT DOCUMENTS

| | | | | |
|---|---|---|---|---|
| 3,614,031 A * | 10/1971 | Demboski | .................. | 244/32 |
| 4,084,771 A * | 4/1978 | Creuzet | .................. | 244/31 |
| 7,341,224 B1 * | 3/2008 | Osann, Jr. | .................. | 244/30 |
| 7,356,390 B2 * | 4/2008 | Knoblach et al. | .................. | 701/4 |
| 7,568,656 B2 * | 8/2009 | Handley | .................. | 244/24 |
| 8,061,648 B2 * | 11/2011 | Lachenmeier | .................. | 244/33 |
| 8,505,847 B2 * | 8/2013 | Ciampa et al. | .................. | 244/30 |
| 2013/0062458 A1 * | 3/2013 | Shenhar | .................. | 244/31 |
| 2013/0299628 A1 * | 11/2013 | Ciampa et al. | .................. | 244/30 |

FOREIGN PATENT DOCUMENTS

| | | | |
|---|---|---|---|
| EP | 0460909 A1 | 12/1991 | |
| EP | 0596555 B1 | 12/1997 | |

* cited by examiner

*Primary Examiner* — Christopher P Ellis
(74) *Attorney, Agent, or Firm* — Lerner, David, Littenberg, Krumholz & Mentlik, LLP (57) ABSTRACT

An apparatus is provided that includes a solenoid chamber having a plunger configured to create an opening in a first balloon envelope of a balloon system when the solenoid chamber is actuated. The opening enables gas to evacuate from the first balloon envelope. A mixer valve having a nozzle is coupled to the solenoid chamber. The mixer valve is configured to create a gas mixture formed from the gas evacuating from the opening and atmospheric gas. A heating device is attached to the nozzle. The heating device is configured to heat the gas mixture created by the mixer valve. A second balloon envelope is attached to the nozzle. The second balloon envelope is arranged to expand in proportion to a quantity of the heated gas mixture passing through the nozzle. This expansion of the second balloon envelope creates an amount of lift for controlling descent of the balloon system.

20 Claims, 7 Drawing Sheets

CONTROLLING DESCENT OF A ZERO PRESSURE BALLOON

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. As such, the balloons include a flexible envelope made of material that may be configured in sections or lobes to create a "pumpkin" or lobed balloon. These lobes are supported by a plurality of tendons. During normal operations, the balloon envelope is filled with gas so that it can float above the Earth in the stratosphere.

Typically, the balloon can be brought back to Earth when the gas is released from within the envelope. However, the balloon should be kept from damage, or from damaging other objects, as it makes contact with the ground.

BRIEF SUMMARY

Aspects of the present disclosure are advantageous for providing an apparatus for controlling descent of a high altitude balloon. This allows the balloon to safely land on the ground after deployment. In one embodiment, the apparatus includes a solenoid chamber that has a plunger configured to create an opening in a first balloon envelope of a balloon system when the solenoid chamber is actuated. The opening enables gas to evacuate from the first balloon envelope. A mixer valve that has a nozzle is coupled to the solenoid chamber. The mixer valve is configured to create a gas mixture formed from the gas evacuating from the opening in the first balloon envelope and atmospheric gas. A heating device is attached to the nozzle. The heating device is configured to heat the gas mixture created by the mixer valve. A second balloon envelope is attached to the nozzle. The second balloon envelope is arranged to expand in proportion to a quantity of the heated gas mixture passing through the nozzle. This expansion of the second balloon envelope creates an amount of lift for controlling descent of the balloon system.

In one example, a control unit is configured to remotely actuate the solenoid chamber. Upon actuation, the solenoid chamber causes movement of the plunger towards the first balloon envelope with sufficient force to create the opening. This opening is confined to a region of the first balloon envelope corresponding to a boundary region of the solenoid chamber. An activation unit is also in communication with the control unit and the heating device. Activation of the activation unit causes the heating device to heat element. The activation unit is activated in response to a command from the control unit.

In another example, the mixer valve includes one or more gas inlets and a gas outlet. The one or more gas inlets are arranged to mix the atmospheric gas with the gas evacuating from the opening in the first balloon envelope, and the gas outlet is arranged to discharge the gas mixture through the nozzle. The mixer valve is configured to provide a stoichiometric ratio of each gas.

In yet another example, the expansion of second balloon envelope is caused by filling the envelope with an amount of the heated gas mixture passing through the nozzle. The amount of lift caused by the expansion of the second balloon envelope is different than an amount of lift in the first balloon envelope.

In another embodiment, a system for controlling balloon descent is provided. The system includes a balloon structure having a first balloon envelope and an apparatus attached to the balloon structure. The apparatus includes a solenoid chamber that has a plunger configured to create an opening in a first balloon envelope when the solenoid chamber is actuated. The opening enables gas to evacuate from the first balloon envelope. A mixer valve that has a nozzle is coupled to the solenoid chamber. The mixer valve is configured to create a gas mixture formed from the gas evacuating from the opening in the first balloon envelope and atmospheric gas. A heating device is attached to the nozzle. The heating device is configured to heat the gas mixture created by the mixer valve. A second balloon envelope is attached to the nozzle. The second balloon envelope is arranged to expand in proportion to a quantity of the heated gas mixture passing through the nozzle. This expansion of the second balloon envelope creates an amount of lift for controlling descent of the balloon structure.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

As noted above, the present disclosure generally relates to providing an apparatus for controlling descent of a high altitude balloon. This allows for control of the way a balloon descends back down to Earth. The balloon has a balloon envelope inflated with a gas (e.g., hydrogen) that causes it to elevate or lift into the atmosphere. In some situations, the balloon may need to come down either intentionally or unintentionally due an event, such as a catastrophic failure. The techniques described herein may allow a user on the ground to send a command to activate an apparatus attached to the balloon that causes the balloon envelope to get rid of its lifting gas in a manner that allows for a safe descent back to Earth.

The apparatus includes a solenoid chamber that has a plunger capable of creating an opening in the balloon envelope. For example, the solenoid chamber can receive a command to actuate the plunger so that it creates the opening. This opening allows the gas to evacuate from the balloon envelope. A mixer valve that has a nozzle is coupled to the solenoid chamber. The mixer valve creates a gas mixture that passes through the nozzle. This gas mixture includes a desirable stoichiometry, e.g., reactive mix, of the gas evacuating from the balloon envelope and atmospheric gas, such as oxygen. Attached to the nozzle is a heating device. The heating device generates a heat source for heating the gas mixture in order to turn it into a heated gas mixture, such as hot air. A second balloon envelope is attached to the balloon structure and the nozzle. The second balloon envelope is initially deflated during normal system operations. It can be later filled with the hot air passing through the nozzle. As more hot air is created, the second balloon envelope beings to expand proportionally. This expansion creates an amount of lift in the second balloon envelope that can control the descent of the balloon structure.

Example System

Figure 1:
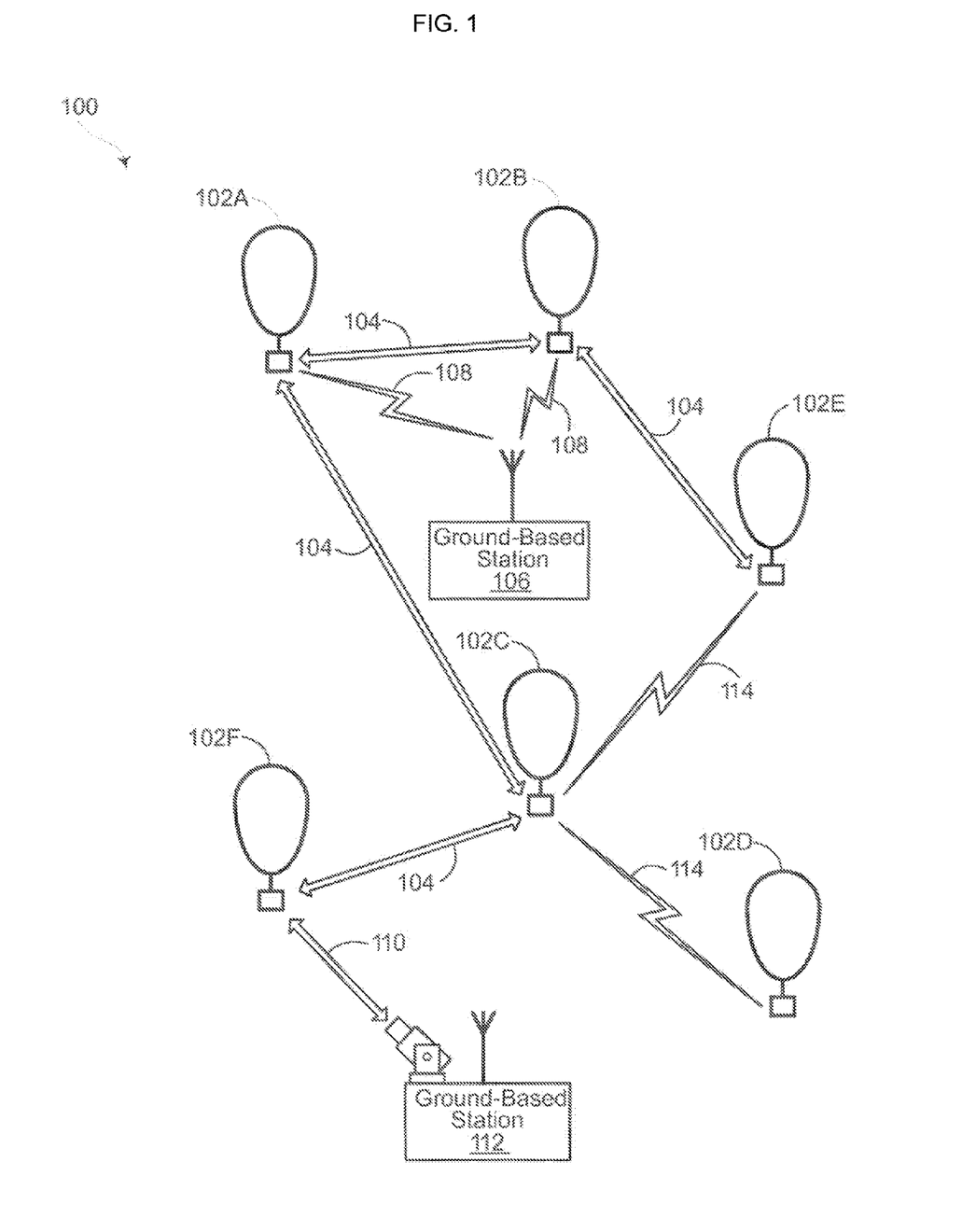
FIG. 1 is a functional diagram of a system in accordance with aspects of the present disclosure.

FIG. 1 depicts an example system 100 in which a balloon as described above may be used. This example should not be considered as limiting the scope of the disclosure or usefulness of the features described herein. System 100 may be considered a "balloon network." In this example, balloon network 100 includes a plurality of devices, such as of balloons 102A-F as well as ground base stations 106 and 112. Balloon network 100 may also include a plurality of additional devices, such as various computing devices (not shown) as discussed in more detail below.

As shown, the devices of system 100 are configured to communicate with one another. As an example, the balloons may include free-space optical links 104 and/or radiofrequency (RF) links 114 in order to facilitate intra-balloon communications. In this way, balloons 102A-F may collectively function as a mesh network for packet data communications. Further, at least some of balloons 102A-B may be configured for RF communications with ground-based stations 106 and 112 via respective RF links 108. Some balloons, such as balloon 102F, could be configured to communicate via optical link 110 with ground-based station 112.

As noted above, to transmit data to another balloon, a given balloon 102 may be configured to transmit an optical signal via an optical link 104. In addition, the given balloon 102 may use one or more high-power light-emitting diodes (LEDs) to transmit an optical signal. Alternatively, some or all of the balloons may include laser systems for free-space optical communications over the optical links 104. Other types of free-space optical communication are possible. Further, in order to receive an optical signal from another balloon via an optical link 104, a given balloon may include one or more optical receivers.

The balloons 102A-F may collectively function as a mesh network. More specifically, since balloons 102A-F may communicate with one another using free-space optical links, the balloons may collectively function as a free-space optical mesh network where each balloon may function as a node of the mesh network. The balloons of balloon network 100 may be high-altitude balloons, which are deployed in the stratosphere. As an example, the balloons may generally be configured to operate at altitudes between 18 km and 25 km above the Earth's surface in order to limit the balloon's exposure to high winds and interference with commercial airline flights.

Additional aspects of the balloons are discussed in greater detail below, with reference to FIG. 2.

Example Balloon

Figure 2:
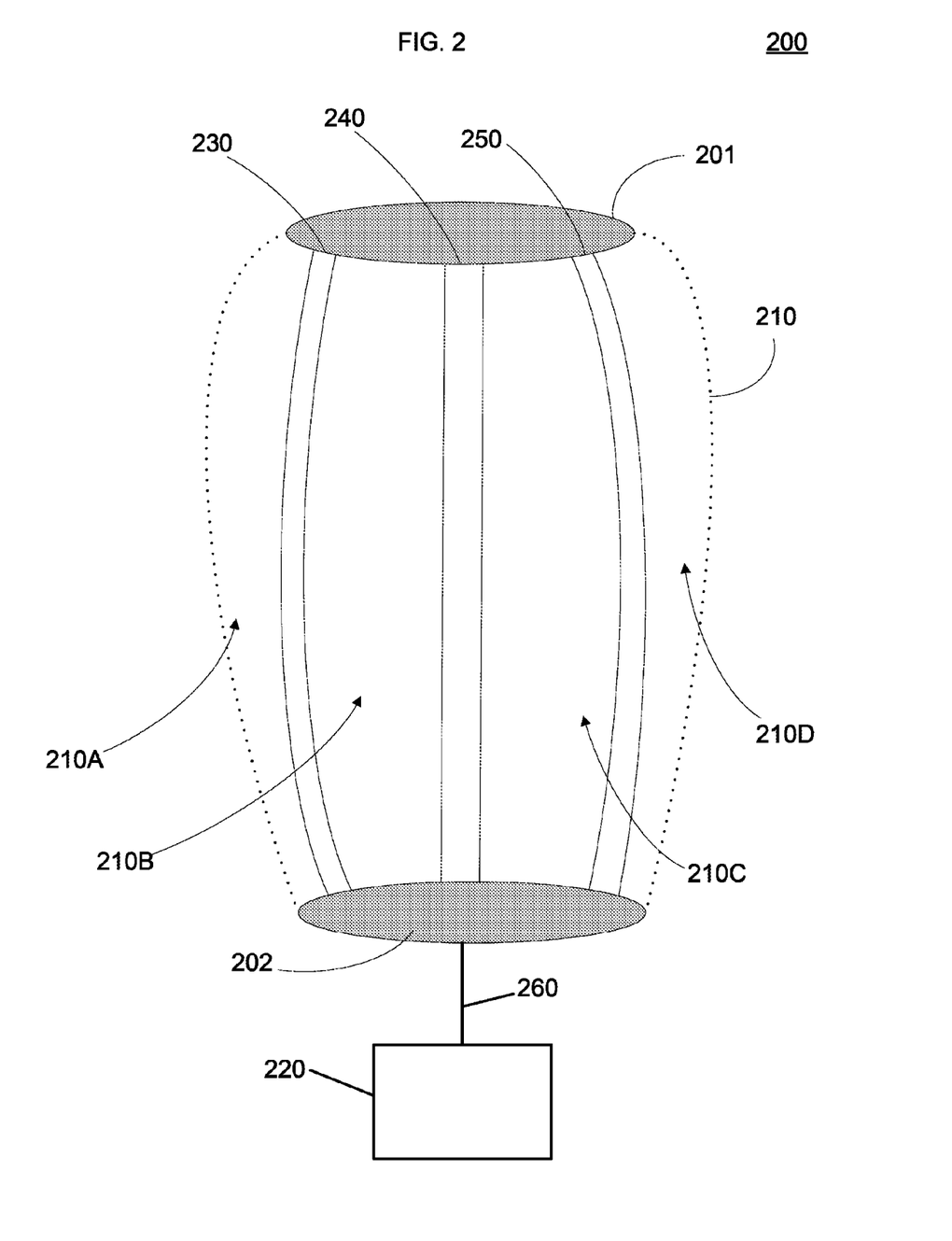
FIG. 2 is an example of a balloon in accordance with aspects of the present disclosure.

FIG. 2 is an example high-altitude balloon 200, which may represent any of the balloons of balloon network 100. As shown, the balloon 200 includes an envelope 210, a payload 220 and a plurality of tendons 230, 240 and 250 attached to the envelope 210.

The high-altitude balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of envelope gores 210A-210D.

Pressurized lifting gas within the balloon envelope 210 may cause a force or load to be applied to the balloon 200. In that regard, the tendons 230-250 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon envelope 210. Bottom ends of the tendons 230, 240 and 250 may also be connected to one another. For example, a corresponding apparatus, e.g., bottom cap 202, is disposed at a base or bottom of the balloon envelope 210. The top cap 201 at the apex may be the same size and shape as and bottom cap 202 at the bottom. Both caps include corresponding components for attaching the tendons 230, 240 and 250. In some examples, the top cap 201 may serve a mounting point for other apparatus attached to the balloon 200. Examples of such apparatus are further discussed below.

Example Apparatus

During normal operations, the balloon 200 floats in the stratosphere above Earth like other balloons in the network. However, there are different situations in which the balloon 200 may need to come down. In some situation, a user may need to bring down the balloon 200 on purpose, for example, to perform maintenance on certain components. In other situations, the balloon 200 may come down due an unplanned event, such as catastrophic failure in the balloon envelope 210.

As noted above, one aspect of the present technology provides an apparatus to control the descent of the balloon 200. For example, the techniques disclosed herein seek to release the pressurized lifting gas from within the balloon envelope 210, such that little to no lifting gas is left inside of the envelope by a time it is on the ground. In some aspects, a heated portion of this lifting gas can be siphon off by the apparatus in order to create a secondary aerial lift that can safely control descent of the balloon 200 back to Earth.

Figure 3:
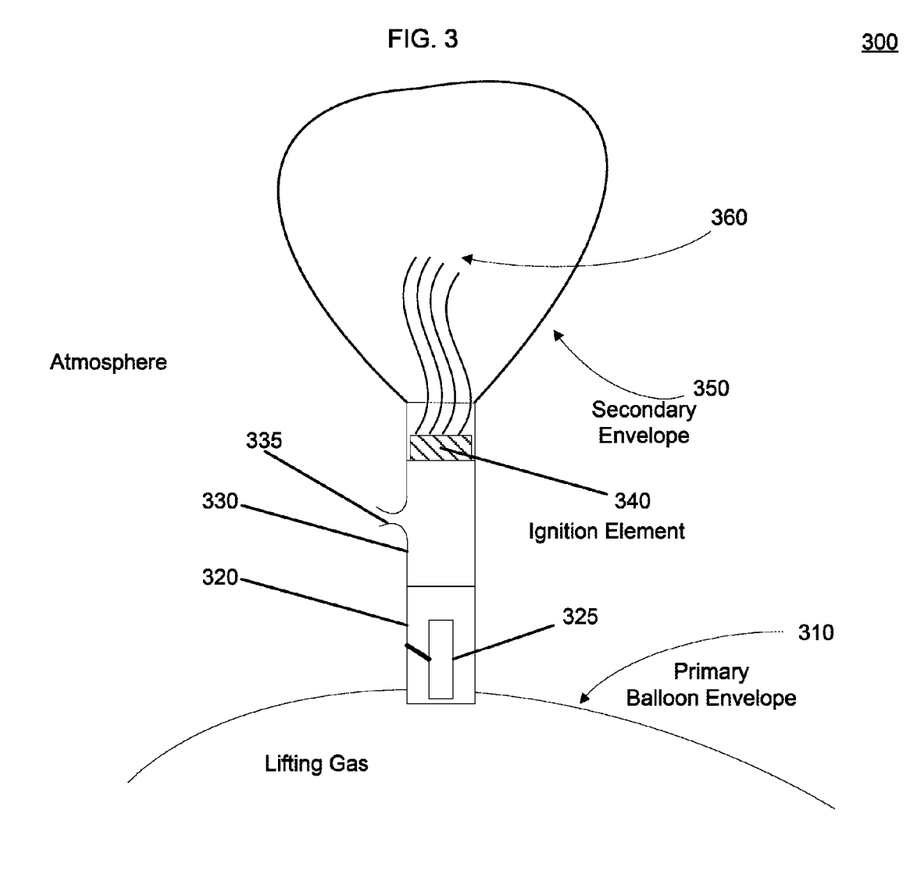
FIG. 3 is an example of an apparatus for controlling descent of a balloon in accordance with aspects of the present disclosure.

FIG. 3 is an example of an apparatus 300 for controlling descent of a balloon that has a primary balloon envelope 310. The apparatus 300 has several components that include a solenoid chamber 320 having an actuating member 325, a mixer valve 330 that has at least one inlet opening 335 configured to introduce atmospheric gas, and a nozzle (not shown) coupled to the chamber 320. The apparatus 300 also includes an ignition element 340 within the nozzle and a secondary balloon envelope 360 attached to that nozzle. The secondary balloon envelope 360 can be filled with a heated gas 360, such as a heated gas mixture created by the mixer valve 330 comprising atmospheric gas and lifting gas.

The apparatus 300 can be attached to the primary balloon envelope 310. For example, an upper portion or apex of the primary balloon envelope 310 can be configured for connection to the apparatus 300. In some aspects, the top cap 201 as discussed above may serve as a mounting point for the apparatus 300. For example, the top cap 201 may include an opening in which the solenoid chamber 320 of the apparatus 300 is attached. This is so that the chamber can access a portion of the balloon envelope 310 in order to release the lifting gas inside. Each of the components of apparatus 300 and their interactions with each other will now be discussed in turn.

Figure 4A:
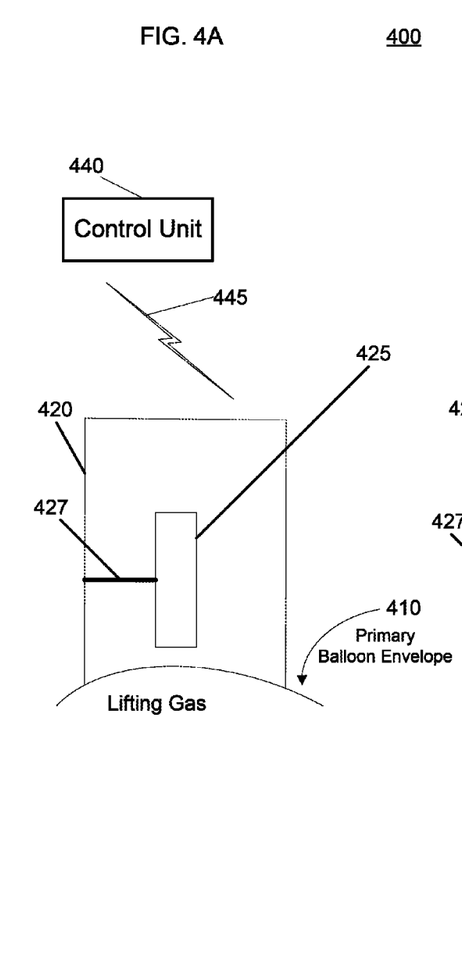
FIG. 4A-4C are examples of a solenoid chamber in accordance with aspects of the present disclosure.
Figure 4B:
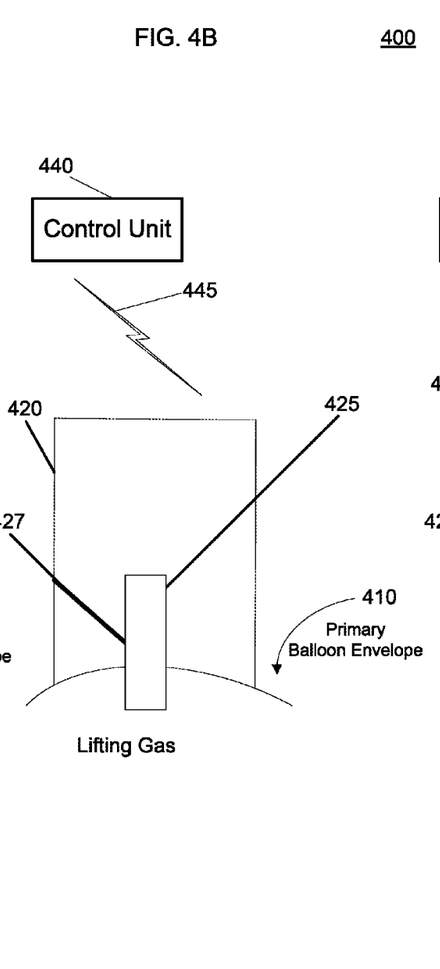
Figure 4C:
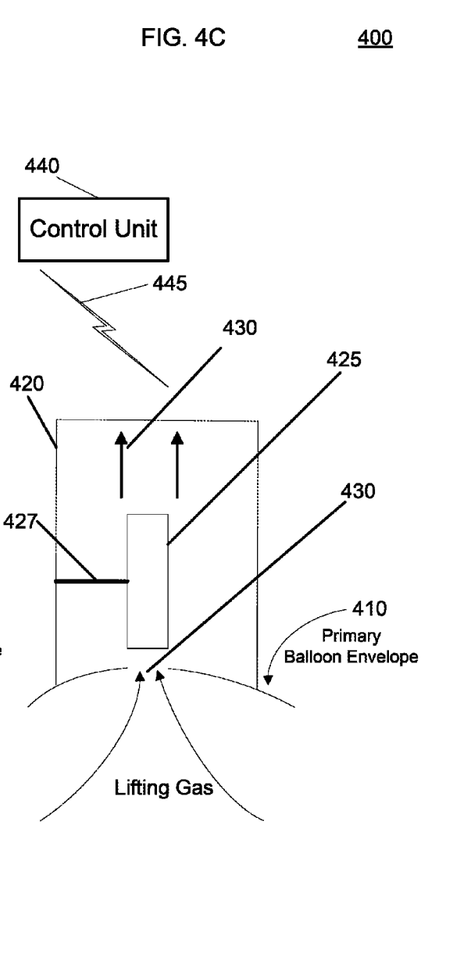

Turing to FIGS. 4A-C, an example of a solenoid chamber 400, such as the solenoid chamber 320 used in apparatus 300, is shown. In this example, solenoid chamber 400 has a housing 420 that includes an actuating member 425, such as a plunger, and a control unit 440 connected via a communication link 445 to the housing 420 for controlling the actuating member 425. For example, to communicate with the housing 420 using communication link 445, the housing includes communication circuitry (not shown). This communication circuitry may include a receiver/transmitter for processing signals to and from the control unit 440. In some examples, these signals may include commands for the housing 420, e.g., to actuate the actuating member 425 to create an opening in the primary balloon envelope 410. As discussed above, the solenoid chamber 400 is able to connect with the primary balloon envelope 410, for example, through top cap 201.

As shown in FIG. 4A, the actuating member 425 is disposed within the housing 420. The actuating member 425 is used to create an opening in the primary balloon envelope 410. This allows the lifting gas to evacuate from the envelope 410 and pass through the housing 420. In some aspects, the actuating member 425 is provided with a protruding portion for creating the opening. For example, the protruding portion is made of a material capable of piercing the skin of the primary envelope 410. In some example, the shape of the protruding portion can assist in piercing the skin of the primary envelope 410. For example, the protruding portion can be shaped into a point or to have jagged edges or various other configurations for creating an opening in the envelope. To move the actuating member 425 towards the primary balloon envelope 410, the solenoid chamber 420 includes a lifting mechanism 427 attached to the member.

In FIG. 4B, the actuating member 425 is shown piercing the skin of the primary balloon envelope 410. In some examples, when the solenoid chamber is actuated this cause the member 425 to move towards the primary balloon envelope 410 with sufficient force to create the opening. For example, the lifting mechanism 427 may include a mechanical arm and gears for lowering and/or raising the arm. As shown here, when the solenoid chamber is actuated the lifting mechanism 427 lowers the actuating member 425 so that it can pierce the primary balloon envelope 410.

Control unit 440 is configured to actuate the solenoid chamber 425. As discussed above, the control unit 440 can communicate with the housing 420 using communication link 445. This allows the control unit 440 to send commands to the lifting mechanism 427 for it to lower or raise the actuating member 425. The communication link 445 is a wireless link that may use any suitable wireless communication protocol. An advantage of the control unit 440 is that it allows a user to be able remotely actuate the solenoid chamber 400, while the user is on the ground and the balloon is high in the stratosphere. As later discussed, the control unit 440 can also be used to activate other components of the apparatus for controlling the descent of the balloon.

In some aspects, the solenoid chamber 400 can be actuated using other techniques. For example, the solenoid chamber 400 can be configured to actuate when it is detected that a catastrophic event has occurred that might bring down the balloon. In some examples, sensors in the balloon may detect different type of failures, such as a sudden drop in altitude or a sudden loss of pressure in the primary balloon envelope 410. In such cases, the solenoid chamber 400 can be configured to receiving a signal from these sensors that will activate the actuating member 425 to create the opening in the balloon envelope. In this regard, the communication circuitry of the housing 420 can be configured to receive these signals from the sensors.

As shown in FIG. 4C, an opening 430 is created after the actuating member 425 pierces the skin of the primary balloon envelope 410. The opening 430 is confined to a region of the first balloon envelope corresponding to the solenoid chamber 400. For example, the region of the envelope pierced by the actuating member 425 may be configured with reinforced stitching so that the opening 430 does not expand beyond a boundary region of the housing 420. This opening 430 allows lifting gas to pass through the solenoid chamber 400. In that regard, the housing 420 of the solenoid chamber 400 is sealed against ingress of atmospheric gas. Instead, the housing 420 is configured so that the atmospheric gas mixes with the lifting gas upstream from the solenoid chamber 400.

Figure 5:
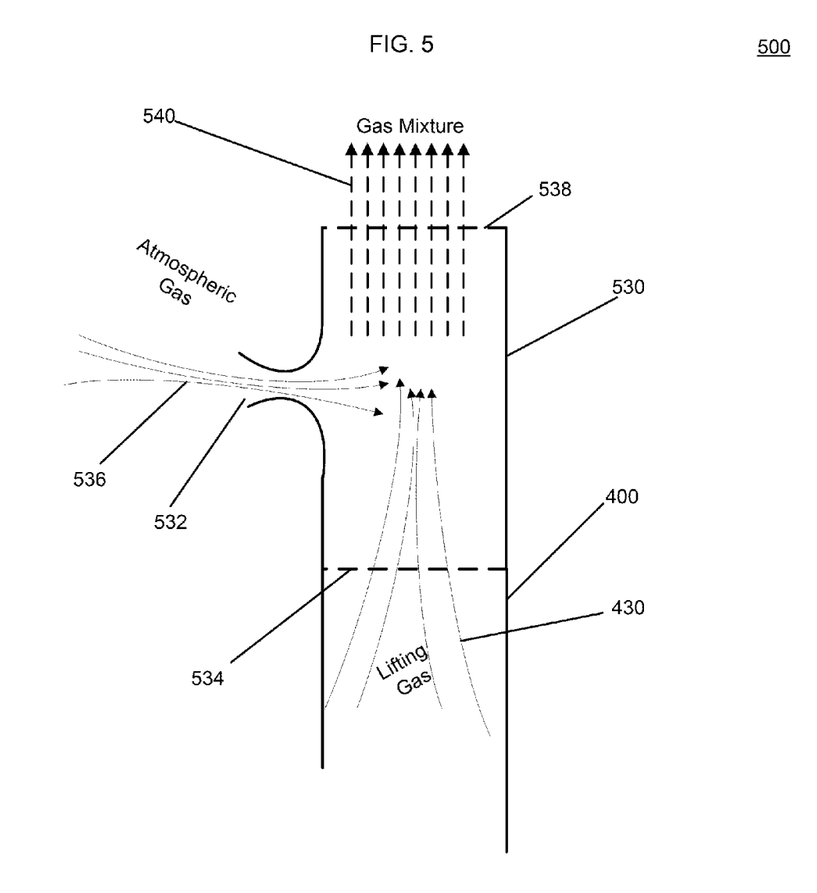
FIG. 5 is an example of a mixer valve in accordance with aspects of the present disclosure.

In FIG. 5, an example of a mixer valve 500 is shown. In this example, the mixer valve 500 has a main body portion 530 and a number of openings, such as openings 532 and 538, for letting gases into and out of the main body portion 530. As shown, the main body portion 530 can be positioned upstream from the solenoid chamber 400.

Mixer valve 500 is arranged so that atmospheric gas can mix with the lifting gas passing through the solenoid chamber 400. For example, the mixer valve 500 includes one or more inlet openings, such as openings 532, to allow gas 536 from the atmosphere into the main body 530 of the valve. The mixer valve 500 also includes another inlet opening 534 between the valve and the solenoid chamber 400 to allow in lifting gas 430 from the chamber 400.

Within the main body portion 530 of the mixer valve 500 a gas mixture 540 is created. For example, the gas mixture 540 includes a stoichiometric ratio of lifting gas 430 to atmospheric gas 536. In some example, the composition of the gas mixture 540 can be preconfigured. For example, more openings or some filters can be added to adjust the amount of gas entering the mixer valve 500. This allows the mixer valve 500 to configure the stoichiometric ratio of lifting gas 430 to atmospheric gas 536 created in the main body portion 530.

The mixer valve 500 may be of a synthetic or processed polymer material like plastic or PVC piping or any similar material capable of withstanding temperatures in the stratosphere. The main body portion 530 of the mixer valve 500 has an elongated nozzle projecting further upstream from the solenoid chamber 400. One end of this elongated nozzle is attached, e.g., screwed in, glued, molded, fused, etc., to the solenoid chamber 400. For this reason, the elongated nozzle of the mixer valve 500 and the solenoid chamber 400 are similarly shaped so that they can be fitted together. This nozzle funnels the gas mixture 540 through the outlet opening 538 at a top end of the valve 530 so that it can be heated.

Figure 6:
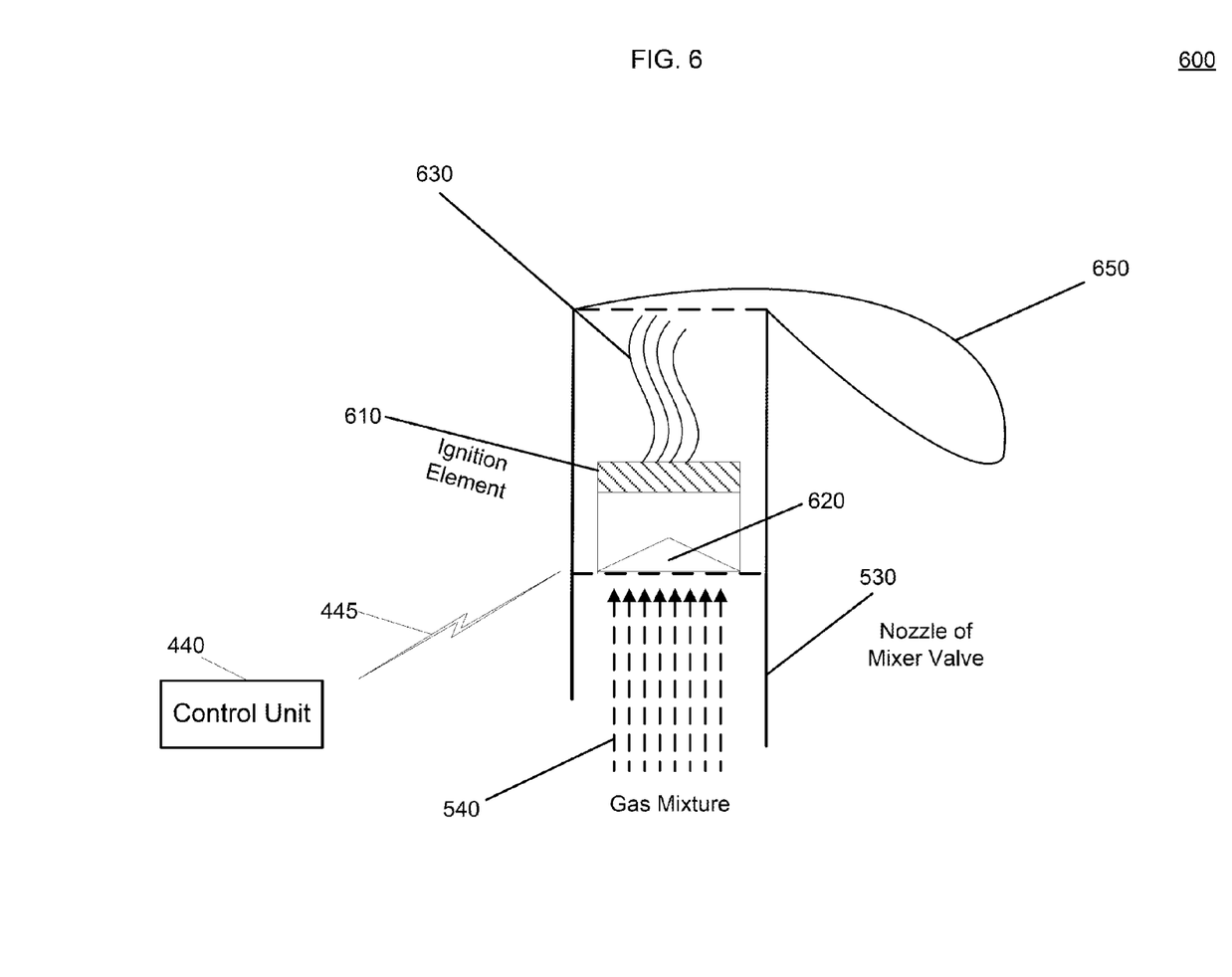
FIG. 6 is an example of a heating device in accordance with aspects of the present disclosure.

In FIG. 6 an example of a heating device 600 is shown. In this example, the heating device 600 includes an ignition element 610 to provide a heat source for heating the gas mixture 540 and an activation unit 620 to ignite the ignition element 610. Ignition element 610 may be disposed within the mixer valve 530 near an end of the elongated nozzle. For example, this end is opposite the solenoid chamber 400. The ignition element 610 is configured to heat the gas mixture 540 of atmospheric and lifting gas as it passes through the nozzle 530. So that the ignition element 610 does not cause damage to the nozzle of the mixer valve 530, in some aspects a protective shielding (not shown), such as thin metal plating, may be provided around the ignition element 610. Alternatively, the ignition element 610 may be configured so that heat emitting may be hot enough the heat the gas mixture 540, but too high so as to damage the nozzle.

The activation unit 620 is used to ignite the ignition element 610. For example, the activation unit 620 may include a device that causes a spark to produce a flame for heating the ignition element 610. In some examples, the activation unit 620 may generate an electrical current that can heat the ignition element or other kinds of units may be used to ignite/heat or otherwise inflame the ignition element 610.

In some aspects, control unit 440 may activate the activation unit 620. In the example discussed above, the control unit 440 is in communication with the solenoid chamber 400 via communication link 445. The control unit 440 may also be configured to use this communication link 445 to communicate with the activation unit 620. For example, in response to receiving a command from the control unit 440 via the communication link 445, the activation unit 620 may ignite the ignition element 610. In this regard, the activation unit 620 also includes communication circuitry (not shown), e.g., a receiver/transmitter for communicating with the control unit 440. Once the ignition element 610 is ignited, the gas mixture 540 will being to be heated. This heated gas mixture 640 then rises from the nozzle of the mixer valve 530 into a secondary balloon envelope 650.

Secondary balloon envelope 650 can be of the same material as the primary balloon envelope, such as polyethylene, polyethylene terephthalate or other similar materials of suitable strength properties. As shown, it is coupled to the nozzle of the mixer valve 530. For example, the secondary balloon envelope 650 may include a connector (not shown), such as an O-ring connecter, that can be used to mate the secondary envelope 650 with the nozzle 530. This creates a secure airtight seal between the two. In some example, other types of connectors that secure the secondary balloon envelope 650 to the nozzle 530 may be used in order to create this airtight seal.

The secondary balloon envelope 650 is arranged to expand in proportion to an amount of the heated gas mixture 640 passing through the nozzle 530. For example, as more of the heated gas mixture 640 rises from the nozzle 530 it flows into the secondary balloon envelope 650, thus filling out its interior body. However, it is not necessary for the secondary balloon envelope 650 to fully expand. This expansion creates a certain amount of aerial lift in the secondary balloon envelope 650. Although this aerial lift is not the same amount of lift in the primary envelope 650, it is enough to support the weight of the balloon and any attached payload so that they both can gradually descend back to Earth.

Figure 7A:
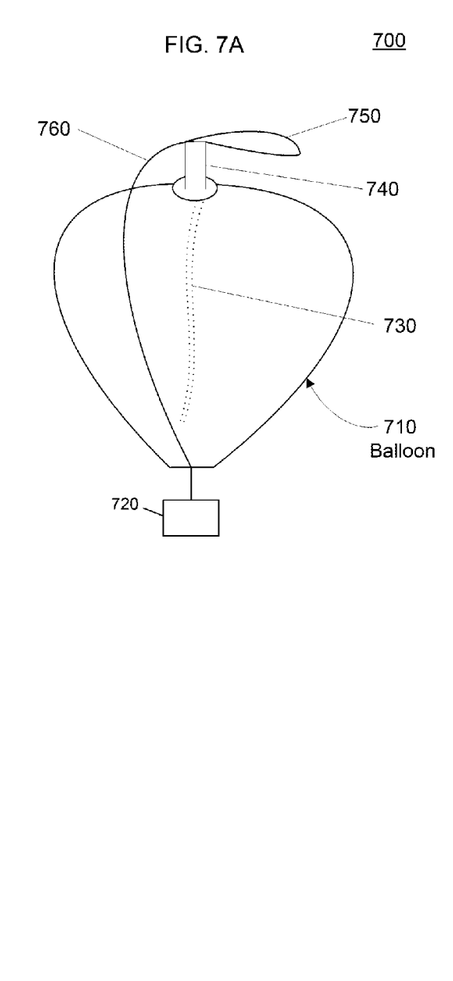
FIG. 7A-7C are examples of an apparatus controlling the descent of a balloon in accordance with aspects of the present disclosure.
Figure 7B:
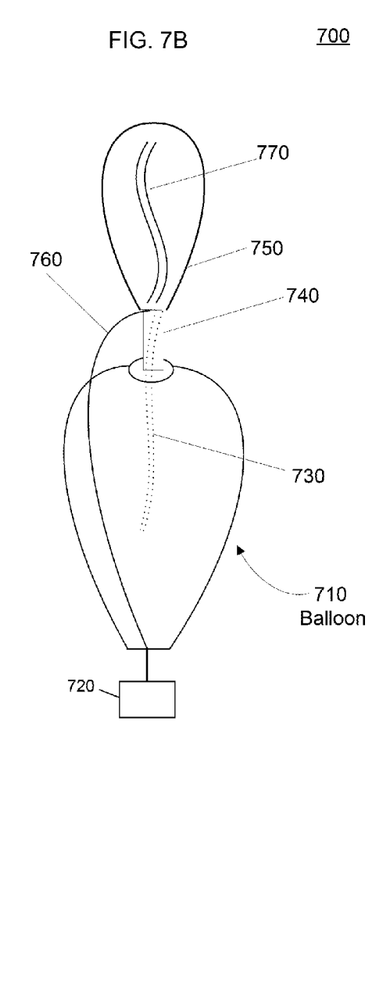
Figure 7C:
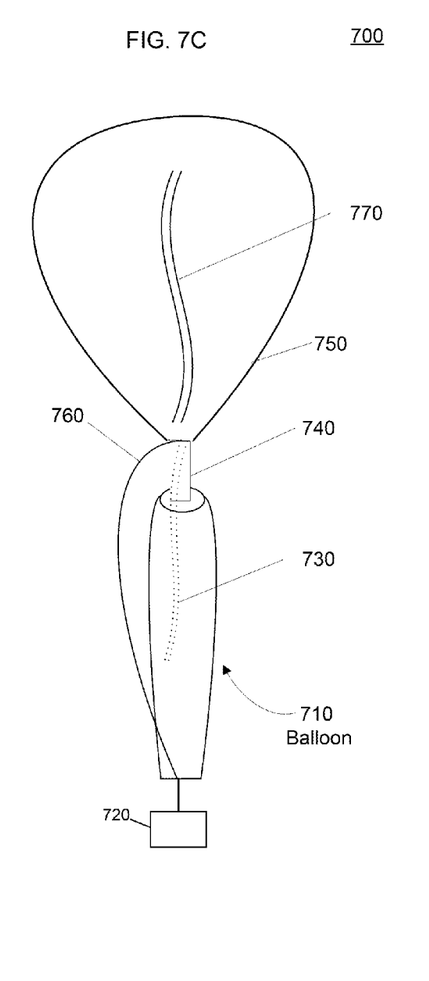

Turing to FIGS. 7A-C, an example 700 of an apparatus 740 controlling the descent of a balloon 702 is shown. In this example, in FIG. 7A a balloon 710 filled with a lifting gas 730 (e.g., hydrogen) is shown carrying a payload 720 in the air. To control descent of the balloon 710 back to the ground, the apparatus 740 as described above will inflate a secondary balloon 750 that is initially deflated. For example, the secondary balloon 750 will be filled with a siphoned off portion of lifting gas 730 that has been heated. This secondary balloon 750 may also be attached to the payload 720 of the balloon using a cable 760 made of a material, such as steel, strong enough to support the weight of the payload 720. In FIG. 7B, the secondary balloon 750 is shown being inflated with the heated gas mixture 770. In this example, the balloon 710 starts to deflate as the lifting gas 730 is siphoned off to make the heated gas mixture 770. This also causes the balloon 710 to further descend in a controlled manner closer to Earth. And in FIG. 7C, the secondary balloon 750 is shown even further inflated. By this time, most of the lifting gas has been released from the balloon 710 as it gradually approaches safely on the ground.

The above-described aspects of the technology may be advantageous for controlling descent of a high-altitude balloon from the stratosphere. This may allow the balloon to be retrieved undamaged after it has safety landed on the ground. By providing techniques to convert gas in the balloon envelope into heated vapor gas (e.g., hot air), this vapor gas can be used to fill a second balloon envelope that is configured to control the descent of the balloon. Moreover, the various components of the technique may be modified to further manage and control the balloon as it descends back to Earth.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. An apparatus for controlling balloon descent, comprising:
    a solenoid chamber having a plunger configured to create an opening in a first balloon envelope of a balloon sys- tem when the solenoid chamber is actuated, the opening enabling gas to evacuate from the first balloon envelope;

a mixer valve having a nozzle coupled to the solenoid chamber, the mixer valve configured to create a gas mixture formed from the gas evacuating from the opening in the first balloon envelope and atmospheric gas;

a heating device attached to the nozzle, the heating device configured to heat the gas mixture created by the mixer valve; and a second balloon envelope attached to the nozzle, the second balloon envelope arranged to expand in proportion to a quantity of the heated gas mixture passing through the nozzle, wherein the expansion of the second balloon envelope creates an amount of lift for controlling descent of the balloon system.

2. The apparatus of claim 1, further comprising a control unit configured to remotely actuate the solenoid chamber.

3. The apparatus of claim 2, wherein the solenoid chamber, upon actuation, causes movement of the plunger towards the first balloon envelope with sufficient force to create the opening.

4. The apparatus of claim 3, wherein the opening is confined to a region of the first balloon envelope corresponding to a boundary region of the solenoid chamber.

5. The apparatus of claim 2, further comprising an activation unit in communication with the control unit and the heating device, wherein activation of the activation unit causes the heating device to heat the ignition element.

6. The apparatus of claim 5, wherein the activation unit is activated in response to a command from the control unit.

7. The apparatus of claim 1, wherein the mixer valve includes one or more gas inlets and a gas outlet, the one or more gas inlets being arranged to mix the atmospheric gas with the gas evacuating from the opening in the first balloon envelope, and the gas outlet being arranged to discharge the gas mixture through the nozzle.

8. The apparatus of claim 7, wherein the mixer valve is configured to provide a stoichiometric ratio of each gas.

9. The apparatus of claim 1, wherein the expansion is caused by filling the second balloon envelope with an amount of the heated gas mixture.

10. The apparatus of claim 9, wherein the amount of lift caused by the expansion of the second balloon envelope is different than an amount of lift in the first balloon envelope.

11. A system for controlling balloon descent, comprising:
a balloon structure having a first balloon envelope; and
an apparatus attached to the balloon structure, the apparatus comprising:

a solenoid chamber having a plunger configured to create an opening in the first balloon envelope when the solenoid chamber is actuated, the opening enabling gas to evacuate from the first balloon envelope;

a mixer valve having a nozzle coupled to the solenoid chamber, the mixer valve configured to create a gas mixture formed from the gas evacuating from the opening in the first balloon envelope and atmospheric gas;

a heating device attached to the nozzle, the heating device configured to heat the gas mixture created by the mixer valve; and a second balloon envelope attached to the nozzle, the second balloon envelope arranged to expand in proportion to a quantity of the heated gas mixture passing through the nozzle, wherein the expansion of the second balloon envelope creates an amount of lift for controlling descent of the balloon structure.

12. The system of claim 11, further comprising a control unit configured to remotely actuate the solenoid chamber.

13. The system of claim 12, wherein the solenoid chamber, upon actuation, causes movement of the plunger towards the first balloon envelope with sufficient force to create the opening.

14. The system of claim 13, wherein the opening is confined to a region of the first balloon envelope corresponding to a boundary region of the solenoid chamber.

15. The system of claim 12, further comprising an activation unit in communication with the control unit and the heating device, wherein activation of the activation unit causes the heating device to heat the ignition element.

16. The system of claim 15, wherein the activation unit is activated in response to a command from the control unit.

17. The system of claim 11, wherein the mixer valve includes one or more gas inlets and a gas outlet, the one or more gas inlets being arranged to mix the atmospheric gas with the gas evacuating from the opening in the first balloon envelope, and the gas outlet being arranged to discharge the gas mixture through the nozzle.

18. The system of claim 17, wherein the mixer valve is configured to provide a stoichiometric ratio of each gas.

19. The system of claim 11, wherein the expansion is caused by filling the second balloon envelope with an amount of the heated gas mixture.

20. The system of claim 19, wherein the amount of lift caused by the expansion of the second balloon envelope is different than an amount of lift in the first balloon envelope.

* * * * *